Patented Apr. 28, 1936

2,038,691

UNITED STATES PATENT OFFICE 2,038,691

GLASS RESISTANT TO ALKALI METAL VAPORS AND METHOD OF MAKING IT

William C. Taylor, Corning, N. Y., assignor to Corning Glass Works, Corning, N. Y., a corporation of New York No Drawing. Application November 6, 1934,
Serial No. 751,795

20 Claims. (Cl. 91—70)

This invention relates to glasses which are resistant to discoloration by hot alkali metal vapors and has for its object to impart resistance to normally non-resistant glasses.

Ordinary glasses are subject to a rapid discoloration of their surface when heated to 250° C. to 350° C., or higher, in contact with alkali metal vapors, as for example, in the sodium vapor arc lamp. Such discoloration greatly decreases the luminosity of the lamp and has been the chief obstacle to the successful development of this efficient light source. It has been shown that this discoloration is in some manner dependent upon a high silica content in the glass whereby the sodium causes reduction of some of the silica to metallic silicon. Various glasses of abnormally low silica content have been proposed as envelopes for such lamps to overcome the difficulty. These special glasses possess undesirable characteristics, particularly with respect to chemical stability and softness, which not only makes difficult the fabrication of tubes, bulbs and the like therefrom, by ordinary glass working methods, but also renders such articles easily susceptible to atmospheric attack. It has further been proposed to cover and protect these special glasses against atmospheric attack by flashing them on the inside of ordinary stable glasses, but their working properties are so different from normal glasses that the results have been unsatisfactory.

I have discovered that ordinary stable glasses which are normally discolored by contact with hot alkali metal vapors may be rendered resistant to such discoloration by coating them with a mixture of alkali fluoride and boric acid, preferably in solution in water, and fusing the mixture into the surface of the glass. Other boron salts which decompose into boric oxide on being heated, such as ammonium borate, may be used in lieu of boric acid.

I have also found that, in general, mixtures of alkali fluoride and boric oxide soften or fuse at lower temperatures than either boric oxide or the alkali fluoride alone. This lowering of the fusing point in such mixtures results in an eutectic or minimum melting point. In the case of the mixture comprising potassium fluoride and boric acid, the composition having the lowest melting point seems to be in the neighborhood of the mixture which would have the theoretical composition 57% KF and 43% $B_2O_3$. However, this particular composition crystallizes on cooling and I therefore prefer to use a mixture which forms the theoretical composition 41.5% KF and 58.5% $B_2O_3$, because this composition is also easily fusible and does not crystallize on cooling.

I have further found that, whereas boric acid is only sparingly soluble in water, it is appreciably more soluble when mixed with alkali fluorides especially when such mixtures have compositions which are in the neighborhood of the lowest melting compositions. This property has the advantage that it makes possible the easy preparation of solutions of the salts in various concentrations.

The use of a low melting composition is particularly advantageous in my process, since it allows the protective coating to be fired into the glass surface at a lower temperature and/or in a shorter period of time than would otherwise be possible. Although I prefer to use potassium fluoride, because it has given the best results for my purpose, I have found that sodium fluoride also gives good results and I have every reason to believe that the fluorides of the other alkali metals will also produce at least some of the benefits of my invention.

The following compositions have been used successfully:

|  | A | B | C |
|---|---|---|---|
| KF | 20 | 10 | ---- |
| $H_3BO_3$ | 50 | 50 | 50 |
| $NaHF_2$ | ---- | 10 | ---- |
| NaF | ---- | ---- | 10 |

In practicing my invention I dissolve the constituents, for example, one of the above batches, in about 400 cc. of water and atomize the solution on to the glass which is heated hot enough to cause the solution to dry practically instantly, leaving the salts deposited on the glass. In the case of hollow articles, such as bulbs which are treated on their interior surfaces, the article is rotated during heating and atomizing in order to obtain the most uniform coating. The glass may also be coated by merely rinsing it with the solution and the film of solution remaining thereon is then dried uniformly by means of a jet of dry hot air. After being thus coated, the article is heated preferably in an electric muffle at about 600° C. to 650° C. for 15 minutes to a half hour, and after cooling is ready for use with hot alkali metal vapors. Although the thickness of the coating may be built up by long spraying, a thin coating, say not to exceed about .005 mm. in thickness, is preferable, because it is not liable to craze and peel off and is substantially transparent. A convenient way of gauging thickness is to prepare a standard of reference comprising an article which has been atomized but not fired and which has received the amount of deposited salt which is found most suitable. Since the atomized coating before firing is visible as a frosted appearance, and since the frosted appearance varies with the length of time of spraying or with the thickness of the coating, it is possible to spray any number of articles to practically the same thickness by spraying them to match the appearance of the standard. After being fired, the coating is fused into the surface of the glass and is substantially transparent, provided the original coating of the salts was not too thick.

When the above described mixtures of alkali fluoride and boric acid, or alkali fluoride and ammonium borate, etc., are fired on to the glass, the boric acid or ammonium borate should theoretically be entirely converted to boric oxide, but it is probable that a small amount of combined water remains in the coating after firing. This is not definitely known. Although the presence of such combined water would mean that the contents of alkali fluoride and boric oxide in the coating after firing would not correspond exactly to the theoretical amounts in the batch or present in the coating before firing, the ratio of alkali fluoride to boric oxide would be constant, provided that volatilization of boron fluoride or hydrofluoric acid during firing, which is unlikely, did not occur. For example, batches A, B and C will produce coatings containing alkali fluoride and boric oxide in the approximate ratios of 1 to 1.4, 1 to 1.4 and 1 to 2.8 respectively.

In spite of the increase in solubility which I have noted in mixtures of alkali fluoride and boric acid, the fired-in coating thereof is substantially resistant to the effect of atmospheric moisture, but in fabricating a lamp from a bulb so coated on its interior surface, it is desirable to direct the flame of the burner away from the interior of the bulb and to keep all parts of the bulb as warm as possible to avoid condensation. Such coatings are also very resistant to discoloration by hot alkali metal vapors and will remain nearly colorless when heated for one week at 350° C. in contact with the saturated vapor of metallic sodium.

While in the foregoing there has been shown and described the preferred embodiment of my invention, it is to be understood that minor changes in the details of construction, combination and arrangement of parts may be resorted to without departing from the spirit and scope of the invention as claimed.

I claim.

1. The method of treating glass to make it resistant to discoloration by hot alkali metal vapors, which includes applying to the surface of the glass a fused-in coating of alkali fluoride and boric oxide.

2. The method of treating glass to make it resistant to discoloration by hot alkali metal vapors, which includes applying to the surface of the glass a fused-in coating of alkali fluoride and boric oxide not thicker than .005 mm.

3. The method of treating glass to make it resistant to discoloration to hot alkali metal vapors, which includes applying to the surface of the glass a mixture of salts comprising an alkali fluoride and boric acid, and heating the glass to fuse the mixture into the surface thereof.

4. The method of treating glass to make it resistant to discoloration by hot alkali metal vapors, which includes applying to the surface of the glass a mixture of salts comprising an alkali fluoride and boric acid, and heating the glass to fuse the mixture into the surface thereof and form a layer not thicker than .005 mm.

5. The method of treating glass to make it resistant to discoloration by hot alkali metal vapors, which includes applying to the surface of the glass a mixture of potassium fluoride and boric acid, and heating the glass to fuse the mixture into the surface thereof.

6. The method of treating glass to make it resistant to discoloration by hot alkali metal vapors, which includes applying to the surface of the glass a mixture of potassium fluoride and boric acid, and heating the glass to fuse the mixture into the surface thereof and form a layer not thicker than .005 mm.

7. The method of treating glass to make it resistant to discoloration by hot alkali metal vapors, which includes applying to the surface of the glass a mixture of sodium fluoride and boric acid, and heating the glass to fuse the mixture into the surface thereof.

8. The method of treating glass to make it resistant to discoloration by hot alkali metal vapors, which includes applying to the surface of the glass a mixture of sodium fluoride and boric acid, and heating the glass to fuse the mixture into the surface thereof and form a layer not thicker than .005 mm.

9. The method of treating glass to make it resistant to discoloration by hot alkali metal vapors, which includes applying to the surface of the glass a mixture of potassium fluoride, sodium fluoride and boric acid, and heating the glass to fuse the mixture into the surface thereof.

10. The method of treating glass to make it resistant to discoloration by hot alkali metal vapors, which includes applying to the surface of the glass a mixture of potassium fluoride, sodium fluoride and boric acid, and heating the glass to fuse the mixture into the surface thereof and form a layer not thicker than .005 mm.

11. The method of treating glass to make it resistant to discoloration by hot alkali metal vapors, which includes dissolving in about 400 cc. of water a mixture comprising approximately 20 grams of potassium fluoride and 50 grams of boric acid, wetting the surface of the glass with the solution, drying the wet film and heating the glass at 600° C. to 650° C. for 15–30 minutes.

12. The method of treating glass to make it resistant to discoloration by hot alkali metal vapors, which includes dissolving in about 400 cc. of water a mixture comprising approximately 10 grams of sodium fluoride and 50 grams of boric acid, wetting the surface of the glass with the solution, drying the wet film and heating the glass at 600° C. to 650° C. for 15–30 minutes.

13. The method of treating glass to make it resistant to discoloration by hot alkali metal vapors, which includes dissolving in about 400 cc. of water a mixture comprising approximately 10 grams of potassium fluoride, 10 grams of sodium bifluoride and 50 grams of boric acid, wetting the surface of the glass with the solution, drying the wet film and heating the glass at 600° C. to 650° C. for 15–30 minutes.

14. A glass which is resistant to discoloration by hot alkali metal vapors, which has on its surface a fused-in layer consisting practically entirely of alkali fluoride and boric oxide.

15. A glass which is resistant to discoloration by hot alkali metal vapors, which has on its surface a fused-in layer consisting practically entirely of alkali fluoride and boric oxide not thicker than .005 mm.

16. A glass which is resistant to discoloration by hot alkali metal vapors, which has on its surface a fused-in layer consisting practically entirely of potassium fluoride and boric oxide.

17. A glass which is resistant to discoloration by hot alkali metal vapors, which has on its surface a fused-in layer consisting practically entirely of sodium fluoride and boric oxide.

18. A glass which is resistant to discoloration by hot alkali metal vapors, which has on its surface a layer consisting practically entirely of potassium fluoride, sodium fluoride, and boric oxide.

19. A glass which is resistant to discoloration by hot alkali metal vapors, which has on its surface a layer consisting practically entirely of potassium fluoride and boric oxide in the approximate ratio of 1 to 1.4.

20. A glass which is resistant to discoloration by hot alkali metal vapors, which has on its surface a layer consisting practically entirely of sodium fluoride and boric oxide in the approximate ratio of 1 to 2.8.

WILLIAM C. TAYLOR.